US006468459B1

(12) United States Patent
Suzuki

(10) Patent No.: US 6,468,459 B1
(45) Date of Patent: Oct. 22, 2002

(54) PACKING-INTEGRATED TYPE CONNECTOR AND METHOD OF MANUFACTURING THE SAME

(75) Inventor: Shogo Suzuki, Shizuoka (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 09/571,288

(22) Filed: May 16, 2000

Related U.S. Application Data

(62) Division of application No. 09/382,823, filed on Aug. 25, 1999.

(30) Foreign Application Priority Data

Aug. 26, 1998 (JP) .......................................... 10-240002

(51) Int. Cl.$^{7}$ ................................................ B29C 45/14

(52) U.S. Cl. ............. 264/259; 264/272.11; 264/328.12; 425/812

(58) Field of Search ............................ 264/259, 272.11, 264/272.13, 279, 274, 328.12; 425/812

(56) References Cited

U.S. PATENT DOCUMENTS 5,948,991 A * 9/1999 Nomura et al.
5,986,316 A * 11/1999 Toyoda et al.

FOREIGN PATENT DOCUMENTS

| | | | | |
|---|---|---|---|---|
| JP | 62-111711 | * | 5/1987 | ............ 264/328.12 |
| JP | 6-310201 | | 11/1994 | ........... H01R/13/52 |
| JP | 8-162251 | | 6/1996 | ........... H01R/43/24 |

* cited by examiner

*Primary Examiner*—Mathieu D. Vargot
(74) *Attorney, Agent, or Firm*—Sughrue Mion, PLLC

(57) ABSTRACT

A pair of thin-walled portions 6 are formed on packing 3 between a seal lip portion 9$_2$ and a vent hole in a connector housing 1. A pair of short-shot preventing ribs 8 are located contiguously to the thin-walled portions 6. The short-shot preventing ribs 8 are formed in a mold between the seal lip portion 9$_2$ and the vent hole (vent core 5), and a packing material is allowed to reach the vent hole via a narrow gap between each short-shot preventing rib 8 and the connector housing 1. Consequently, the flow resistance of the packing material increases, so that the packing material is preferentially filled in seal lip portions 9$_1$ and 9$_2$. The short-shot preventing ribs 8 may be formed on the connector housing 1 instead of the mold. The pair of short-shot preventing ribs 8 are formed, and the packing material is allowed to reach the vent hole.

4 Claims, 4 Drawing Sheets

PACKING-INTEGRATED TYPE CONNECTOR AND METHOD OF MANUFACTURING THE SAME

This is a divisional of application Ser. No. 09/382,823, filed Aug. 25, 1999, the disclosure of which is incorporated herein by reference.

BACKGROUND OF INVENTION

1. Field of Invention

The present invention relates to a packing-integrated type connector in which a break in a seal lip portion of waterproof packing which is formed integrally with a connector housing is prevented as well as a method of manufacturing the same.

2. Related Art

FIGS. 6 to 7 show a conventional packing-integrated type connector and a method of manufacturing the same.

This packing-integrated type connector C" is arranged such that rubber-made waterproof packing 30 is formed integrally with a synthetic resin-made connector housing 1.

The connector housing 1 has two terminal accommodating chambers 31 (FIG. 7) arranged in parallel in an elliptic housing body 2, and has a hood portion 10 (FIG. 7) provided concentrically on the outer side of the housing body 2. A terminal retaining lance 32 (FIG. 7) is formed in each of the terminal accommodating chambers 31. A pair of terminal inserting holes 34 for a mating female connector (not shown) are formed in a front end wall 33 of the housing body 2 in such a manner as to continue from the terminal accommodating chambers 31, while a pair of openings 35 (FIG. 7) for inserting female terminals (not shown) into the terminal accommodating chambers 31 are formed in a rear-end portion of the housing body 2. Each of the openings 35 continues to a large diameter portion for inserting and fitting a waterproof rubber plug (not shown).

The packing 30 is provided on the outer periphery of a rear half side of the housing body 2 on the inner side of the hood portion 10. Two seal lip portions 37 which are brought into contact with an inner wall surface of a mating female connector housing (not shown) are formed on a front portion of the packing 30. The seal lip portions 37 are formed projectingly with a greater diameter than that of a peripheral wall portion 38 (FIG. 7) of the packing 30.

As shown in FIG. 7, the formation of the packing 30 is effected by inserting a mold 39 between the hood portion 10 and the housing body 2 to form a packing forming gap 40, and by injecting fluid (liquid) silicone rubber 30', which is a packing material, into the packing forming gap 40 through an injection hole 17 penetrating a bottom wall 11' of the hood portion 10. The injection hole 17 continues to a silicone injecting core 4. In addition, a vent hole 15 is provided in a bottom wall 11 of the hood portion 10 on the 180° opposite side of the injection hole 17, and the vent hole 15 continues to a vent core 5 on the outer side. The silicone rubber 30' is injected into the packing forming gap 40 from the silicone injecting core 4, and the air inside the packing forming gap 40 is discharged through the vent hole 15.

With the conventional arrangement, however, since the seal lip portions 37 of the packing 30 are located at a position remote from the silicone injecting core 4, there have been cases where, particularly on the 180° opposite side of the silicone injecting core 4 (on the vent core 5 side), the silicone rubber 30' fails to flow completely round to (fails to fill) seal lip portions 37' and a break 41 occurs from the time the silicone rubber 30' is injected into the packing forming gap 40 from the silicone injecting core 4 until it reaches the vent core 5. In the event that the break 41 occurs in the seal lip portions 37', the waterproof seal characteristic declines, so that such products are inevitably disposed of as defective products, resulting in the deterioration of the yield.

SUMMARY OF INVENTION

In view of the above-described aspect, an object of the present invention is to provide a packing-integrated type connector in which a break in a seal lip portion of packing due to the short shot of the packing material can be reliably prevented as well as a method of manufacturing the same.

To attain the above object, the present invention adopts a packing-integrated type connector in which a vent hole and packing having a seal lip portion are formed in a connector housing, characterized in that a thin-walled portion is formed on the packing between the seal lip portion and the vent hole, whereby the resistance of flow of a fluid packing material toward the vent hole is increased by the thin-walled portion, thereby allowing the packing material to be reliably filled in the seal lip portion.

It is possible to adopt a structure in which a short-shot preventing rib is formed on the connector housing contiguously to the thin-walled portion. In addition, it is also effective to adopt an arrangement in which a pair of short-shot preventing ribs are formed as the short-shot preventing rib, and the packing continues to the vent hole via the pair of short-shot preventing ribs.

In addition, the present invention also adopts a method of manufacturing a packing-integrated type connector in which a fluid packing material is injected between a mold and a connector housing, and air is led out from a vent hole in the connector housing so as to form packing having a seal lip on the connector housing, comprising the steps of: forming a short-shot preventing rib in the mold; and causing the packing material to reach the vent hole via a narrow gap between the short-shot preventing rib and the connector housing.

The short-shot preventing rib may be formed on the connector housing instead of the mold, and the packing material may be caused to reach the vent hole via a narrow gap between the short-shot preventing rib and the mold. In addition, it is also effective to form a pair of short-shot preventing ribs as the short-shot preventing rib, and cause the packing material to reach the vent hole via the pair of short-shot preventing ribs.

DETAILED DESCRIPTION OF PREFERRED EMBODIMENTS

Figure 1:
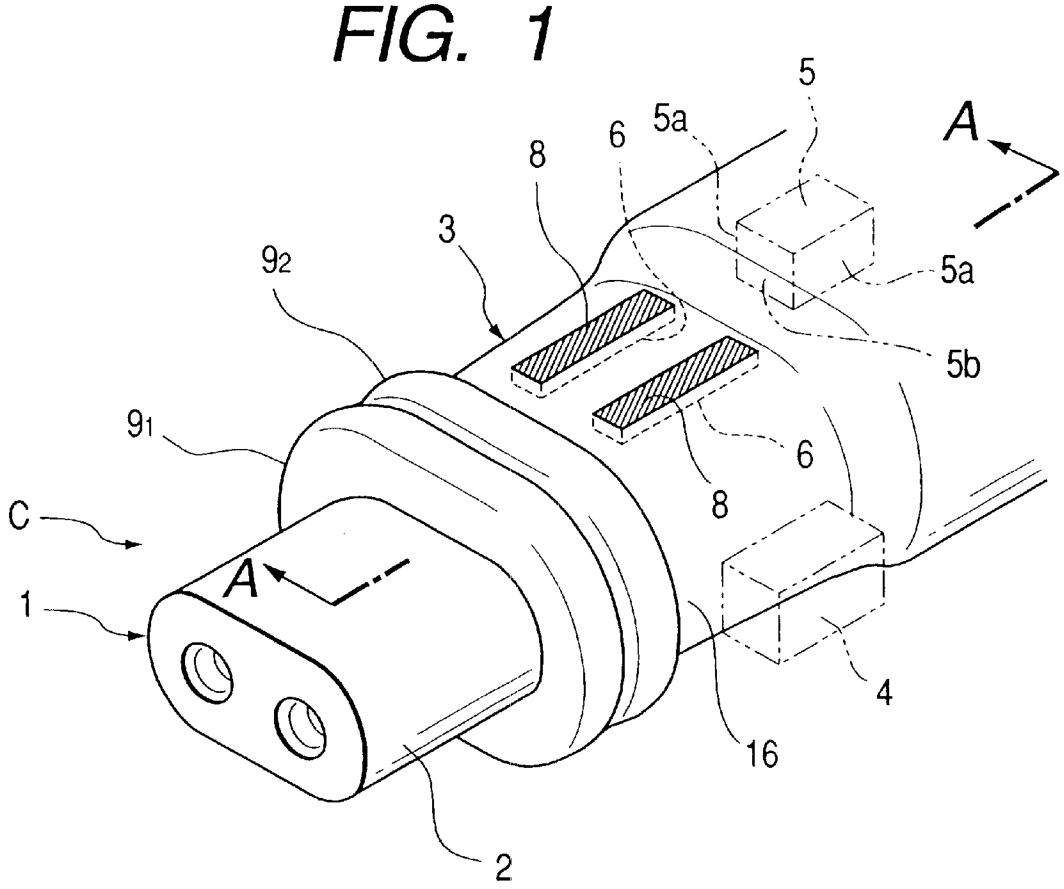
FIG. 1 is a perspective view illustrating an embodiment of a packing-integrated type connector and a method of manufacturing the same in accordance with the present invention.

Referring now to the drawings, a detailed description will be given of an embodiment of the present invention.

FIGS. 1 to 4 illustrate an embodiment of a packing-integrated type connector and a method of manufacturing the same in accordance with the present invention. Those portions that are identical to those of the conventional connector are denoted by the same reference numerals, and a detailed description thereof will be omitted.

In FIG. 1, in waterproof packing 3 formed integrally on the outer periphery of a housing body 2 of a connector housing 1, a pair of thin-walled portions 6 are formed in an axial direction on the 180° opposite side of a silicone injecting core 4, i.e., on the vent core 5 side.

Figure 2:
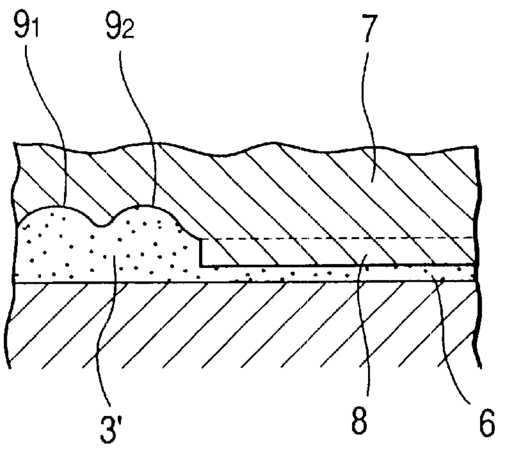
FIG. 2 is a cross-sectional view taken along line A—A of FIG. 1.

The pair of thin-walled portions 6 are formed as a pair of short-shot preventing ribs 8 of a mold 7 advance into the interior of fluid (liquid) silicone rubber 3', which is the packing material, in the thicknesswise direction, as is also shown in FIG. 2. The pair of short-shot preventing ribs 8 are formed in such a manner as to project from the mold 7 in the radial direction of the connector housing, are located in parallel in the axial direction between the vent core 5 and a rear-side seal lip portion $9_2$ of a pair of seal lip portions $9_1$ and $9_2$ on the front end side of the packing 3, and are located on the slightly outer side of a gas leading-out port 5*b* between both side surfaces 5*a* of the vent core 5. It goes without saying that the pair of thin-walled portions 6 are formed at the same position contiguous with the pair of short-shot preventing ribs 8. An unillustrated pair of terminals are fitted in the housing body 2 so as to form a packing-integrated type connector C.

Figure 3:
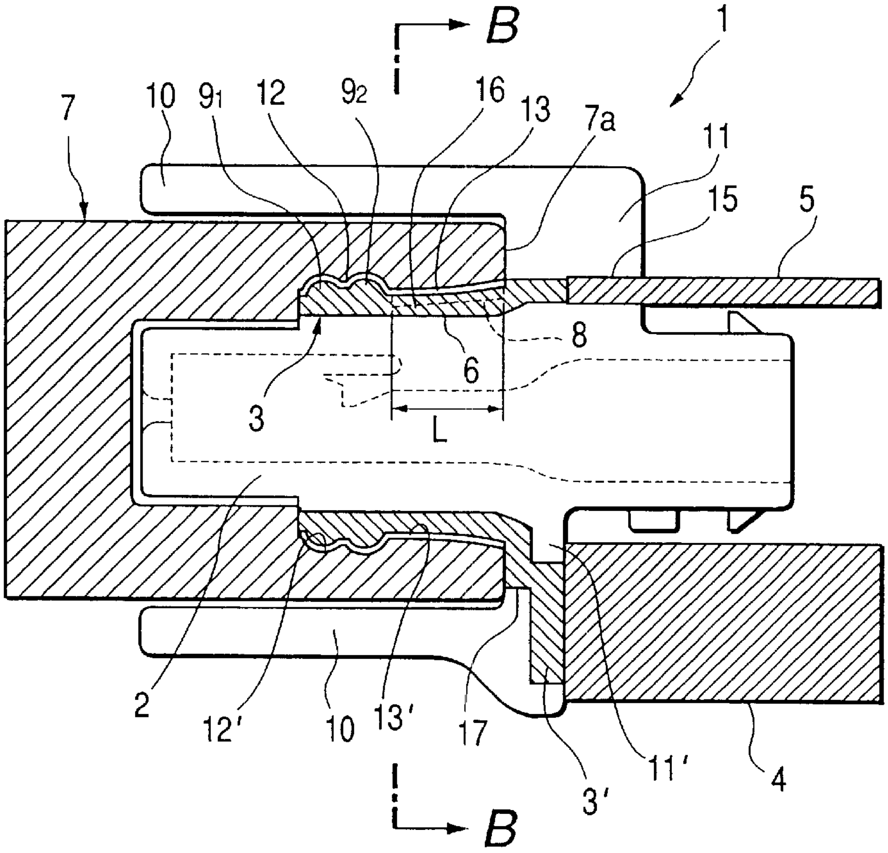
FIG. 3 is a longitudinal cross-sectional view illustrating the packing-integrated type connector and the method of manufacturing the same.

As shown in FIG. 3, each of the short-shot preventing ribs 8 is formed in such a manner as to extend in the range of a distance L from a terminating end of the rear-side seal lip portion $9_2$ of the packing 3 to a bottom wall 11 of a hood portion 10 of the connector housing 1. That is, the short-shot preventing ribs 8 are formed in such a manner as to project in a range from a lip forming groove 12 in the mold 7 to a tip 7*a* of the mold 7 via a peripheral-wall forming gap 13.

Figure 4:
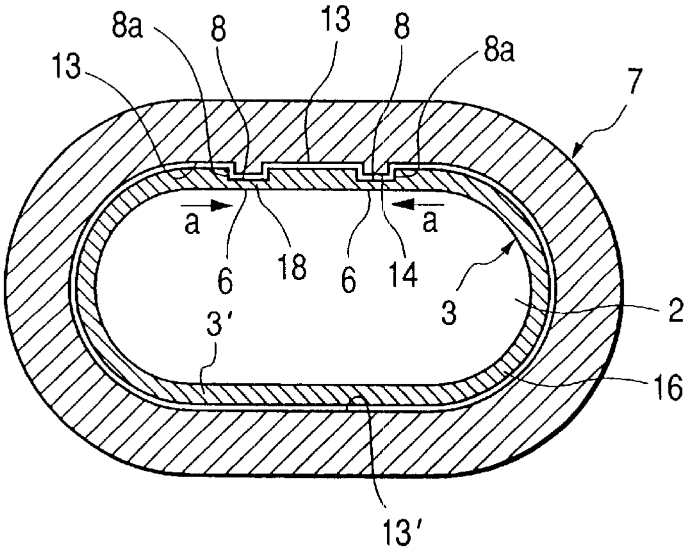
FIG. 4 is a cross-sectional view taken along line B—B of FIG. 3.

As shown in FIG. 4, the short-shot preventing ribs 8 are protrusions each having a rectangular longitudinal section, and extend straightly in the axial direction of the connector. Each thin-walled portion 6 of the packing 3 is formed between each of the short-shot preventing ribs 8 and the housing body 2 of the connector housing 1 (FIG. 3). After the short-shot preventing ribs 8 are removed, U-shaped grooves 14 remain on the thin-walled portions 6 of the packing 3.

In FIG. 3, a vent hole 15 is provided in the bottom wall 11 of the hood portion 10 in the rear of and adjacent to the short-shot preventing ribs 8, and the vent hole 15 continues to the vent core 5. The fluid silicone rubber 3' injected from the silicone injecting core 4 forms the seal lip portions $9_1$ and $9_2$ and a peripheral wall portion 16 of the packing 3 between the female mold 7 and the housing body 2 of the male connector housing 1, and the peripheral wall portion 16 extends to the interior of the vent hole 15.

A silicone injection hole 17 is formed in a bottom wall 11' of the hood portion 10 in a stepped fashion on the 180° opposite side of the short-shot preventing ribs 8, and the silicone injection hole 17 continues to the silicone injecting core 4.

The fluid silicone rubber 3' injected into the mold 7 from the silicone injecting core 4 reaches a lip forming groove 12' from a peripheral-wall forming gap 13 on the lower side (the silicone injecting core side), concurrently flows circumferentially along the peripheral-wall forming gaps 13' and 13 as shown at arrows a in FIG. 4, and reaches outer side surfaces 8*a* of the pair of short-shot preventing ribs 8. The channel for the silicone rubber 3' is narrowed by the pair of short-shot preventing ribs 8, the flow resistance increases as a result, the time until the silicone rubber 3' reaches the vent hole 15 (FIG. 3) located between the pair of short-shot preventing ribs 8 is delayed, and the flow rate of the silicone rubber 3' flowing out to the vent hole 15 decreases.

As a result, the silicone rubber 3' preferentially flows round in the circumferential direction from the low lip forming groove 12' (FIG. 3) to the upper lip forming groove 12 (FIG. 3), thereby allowing the silicone rubber 3' to be reliably filled in the upper lip forming groove 12. This makes it possible to positively prevent breaks in the seal lip portions $9_1$ and $9_2$.

The silicone rubber 3 which struck the outer side surfaces 8a of the short-shot preventing ribs 8 as shown at arrows a (FIG. 4) passes through a narrow gap 18 between each short-shot preventing rib 8 and the housing body 2, flows into the peripheral-wall forming gap 13 between the short-shot preventing ribs 8, and is finally led to the vent hole 15 (FIG. 3). The air inside the lip forming groove 12 passes through the peripheral-wall forming gap 13, and is reliably discharged to the vent core 5 (FIG. 3). Thus, the seal lip portions 91 and 92 are formed reliably, and the venting effect improves.

Figure 5:
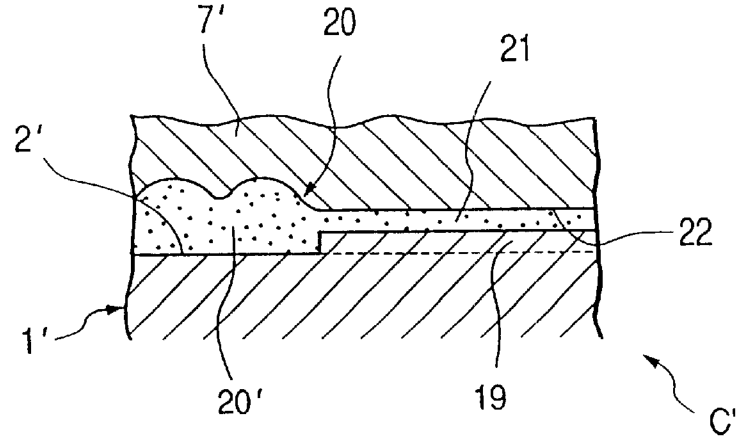
FIG. 5 is a longitudinal cross-sectional view of an essential portion of another embodiment of the packing-integrated type connector and the method of manufacturing the same.
Figure 6:
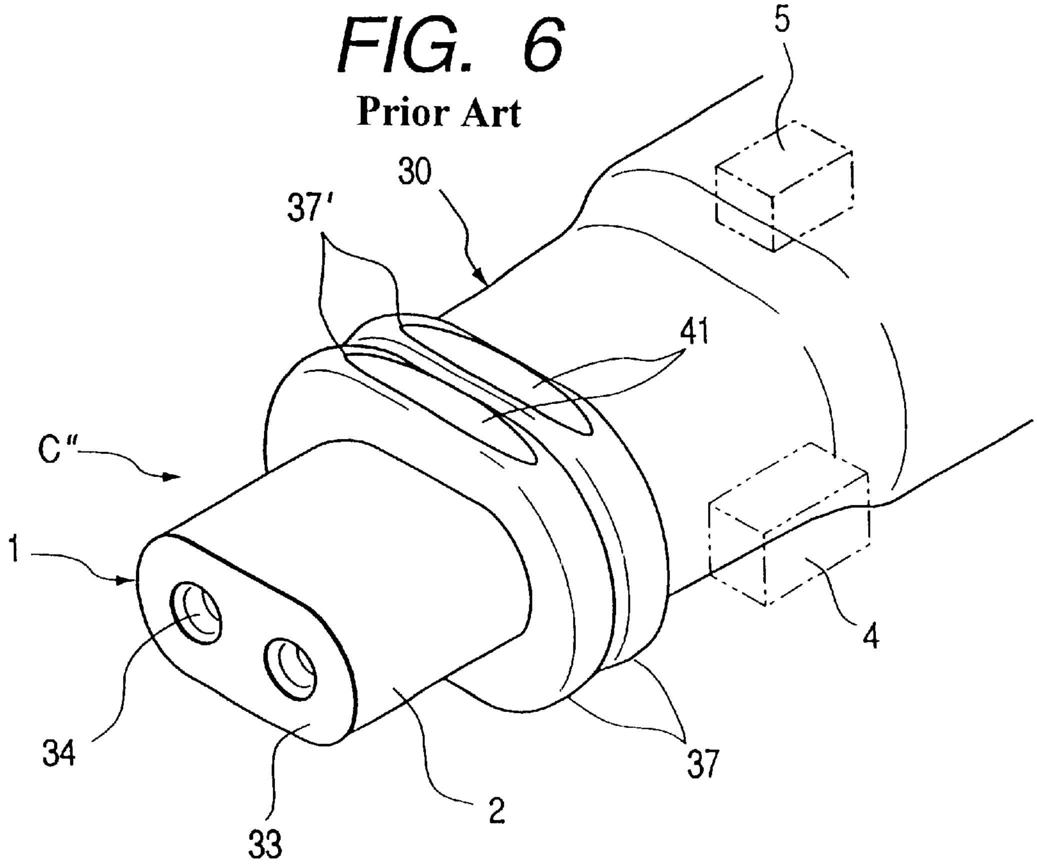
FIG. 6 Prior Art
FIG. 6 is a perspective view illustrating a conventional example.
Figure 7:
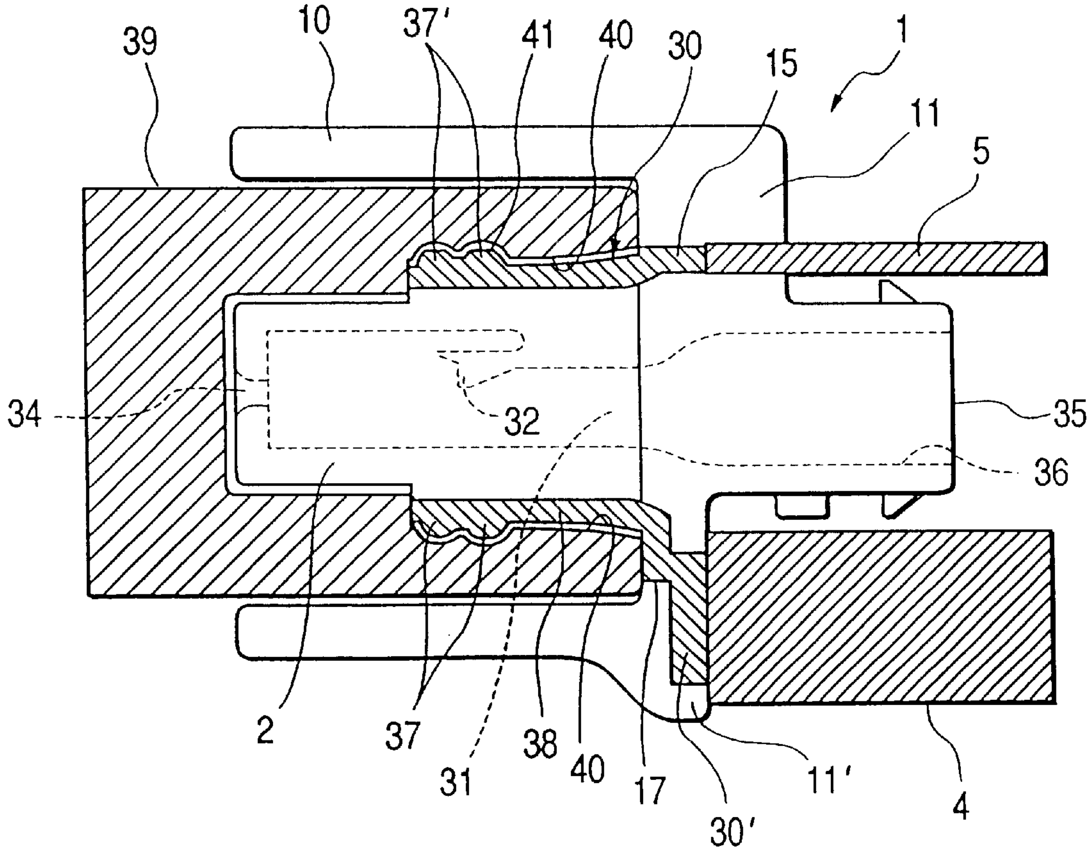
FIG. 7 Prior Art
FIG. 7 is a longitudinal cross-sectional view of the conventional example.

Although the above-described embodiment shows the arrangement in which the pair of short-shot preventing ribs 8 are formed in the mold 7, a pair of short-shot preventing ribs 19 may be formed axially on a synthetic resin-made connector housing 1' instead of a mold 7', as shown in FIG. 5.

In this case, the short-shot preventing ribs 19 are formed on an outer peripheral surface of a housing body 2' of the connector housing 1', and a thin-walled portion 21 of packing 20 is formed in a narrow gap 22 between the mold 7' and each short-shot preventing rib 19. Silicone rubber (packing material) 20' reaches the vent hole 15 (FIG. 3) via this gap 22. It goes without saying that the shape of the pair of short-shot preventing ribs 19 and the positional relationship between the short-shot preventing ribs 19 and the vent core 5 (FIG. 1) are the same as the above-described embodiment. An unillustrated pair of terminals are fitted in the housing body 2' so as to form a packing-integrated type connector C'.

In the packing 20 in this embodiment, the grooves 14 formed after removal of the short-shot preventing ribs 8 (FIG. 4) in the preceding embodiment are not formed, so that the surface of the packing 20 has good appearance.

As described above, in accordance with the present invention, since the fluid packing material is constricted to form a thin-walled portion of the packing, the resistance of flow of the packing material toward the vent hole increases, so that the packing material is preferentially supplied to the seal lip portion. As a result, the break in the seal lip portion is reliably prevented.

In addition, the present invention, the fluid packing material is constricted by the short-shot preventing rib of the connector housing and the fluid resistance hence increases.

Accordingly, in the same way, the packing material is preferentially supplied to the seal lip portion, and the break in the seal lip portion is reliably prevented. In addition, since the thin-walled portion of the packing is formed above the short-shot preventing rib, a U-shaped groove is not formed on the packing, so that the packing has good appearance. In addition, in the present invention, when the packing material flows in the circumferential direction along the side surfaces of the connector housing from two separate directions, the packing material is reliably constricted by the pair of short-shot preventing ribs, so that the flow resistance increased, and the packing material is preferentially supplied to the seal lip portion. As a result, the break in the seal lip portion is reliably prevented. In addition, in the invention, the fluid packing material is constricted by the short-shot preventing rib of the mold and the fluid resistance hence increases.

Accordingly, the resistance of flow of the packing material toward the vent hole increases, so that the packing material is preferentially supplied to the seal lip portion, and the break in the seal lip portion is reliably prevented. In addition, in the present invention, the fluid packing material is constricted by the short-shot preventing rib of the connector housing and the fluid resistance hence increases. Accordingly, the packing material is preferentially supplied to the seal lip portion, and the break in the seal lip portion is reliably prevented. In addition, since the thin-walled portion of the packing is formed above the short-shot preventing rib, a U-shaped groove is not formed on the packing, so that the packing has good appearance.

What is claimed is:

1. A method of manufacturing a packing-integrated connector in which a fluid packing material is injected between a mold and a connector housing, and air is led out from a vent hole in said connector housing so as to form packing having a seal lip on said connector housing, comprising the steps of:

forming a pair of short-shot preventing ribs in said mold extending in an axial direction of said connector between said seal lip and said vent hole; and blocking a smooth flow of said packing material by a narrow gap between said pair of short-shot preventing ribs and said connector housing.

2. The method of manufacturing a packing-integrated connector according to claim 1, said packing material is caused to reach said vent hole between said-pair of short-shot preventing ribs.

3. A method of manufacturing a packing-integrated connector in which a fluid packing material is injected between a mold and a connector housing, and air is led out from a vent hole in said connector housing so as to form packing having a seal lip on said connector housing, comprising the steps of:

forming a pair of short-shot preventing ribs on said connector housing extending in an axial direction of said connector; and blocking a smooth flow of said packing material by a narrow gap between said pair of short-shot preventing ribs and said mold.

4. The method of manufacturing a packing-integrated connector according to claim 3, said packing material is caused to reach said vent hole between said pair of short-shot preventing ribs.

* * * * *